Patented Feb. 7, 1928.

1,658,476

UNITED STATES PATENT OFFICE.

LEROY J. BUTTOLPH, OF GRANTWOOD, NEW JERSEY, ASSIGNOR TO COOPER HEWITT ELECTRIC COMPANY, OF HOBOKEN, NEW JERSEY, A CORPORATION OF NEW JERSEY.

FLUORESCENT PAINT.

No Drawing. Application filed December 17, 1924. Serial No. 756,610.

My present invention relates to a fluorescent paint for use on theatrical costumes and scenery and in other displays wherein the parts painted are subjected to ultra violet radiation for the activation of such fluorescent material and its simultaneous display to spectators in the dark to produce fluorescent effects. It relates particularly to a varnish composition for properly applying such fluorescent material to the parts to be treated.

Heretofore in the use of fluorescent material for such purposes particularly anthracene difficulty has been experienced in securing a good fluorescent paint or varnish due to the fact that a vehicle or carrier could not be found which would dissolve both the anthracene and an adhesive therefor. This difficulty was due in part to the lack of knowledge of a suitable adhesive. I have discovered that benzene is the best solvent both for anthracene and for rubber and a very good varnish for fluorescent effects can be made of anthracene, rubber, and a vehicle of benzene, the benzene being the solvent of both the anthracene and rubber in suitable quantities for making a very desirable fluorescent point. In the varnish of my invention I add in addition to the above substances a suitable amount of sulphur chloride for fixing the rubber cement quickly after it has been applied. The rubber I add in amounts sufficient to serve as an adhesive for the anthracene particles or crystals but in such small amounts that it will not mask the anthracene or cover it to prevent its fluorescent effect and I add it to the varnish mixture in the form of paravar varnish which is generally known and obtainable under that name in the trade. Paravar varnish comprises a vehicle of benzene and rubber with a suitable vulcanizer or fixer such for example as sulphur chloride.

For dipping fabrics such as dress materials and the like I prepare a thin varnish for example one of the following composition: 10 gals. benzene technical, ¾ lb. anthracene 90% pure sublimed, 1 qt. paravar varnish.

For painting scenery, woodwork, floors and so on I use a thicker varnish or paint such for example as one of the following composition: 5 gals. benzene technical, 5 gals. paravar varnish, 1 lb. anthracene 90% pure sublimed.

The benzene evaporates very quickly after application and yet allows sufficient time for the proper application of the paint or varnish. The rubber in the thin film in which it is left upon application of the varnish sets or vulcanizes very quickly due to the action of the vulcanizer or accelerator used therein such for example as sulphur chloride and due to the action of the elements of the air.

I claim:

1. A fluorescent varnish comprising anthracene, rubber and a solvent for the two.

2. A fluorescent varnish comprising benzene, anthracene, and an adhesive for the anthracene.

3. A fluorescent paint comprising benzene, anthracene, and rubber.

4. A fluorescent paint comprising benzene, anthracene, rubber and a vulcanizer for the rubber.

5. A fluorescent paint comprising benzene, anthracene, rubber and sulphur chloride.

6. A fluorescent paint comprising benzene, anthracene in appreciable amounts up to saturation in the benzene, and rubber.

7. A fluorescent paint comprising benzene, anthracene in appreciable amounts up to saturation in the benzene, rubber, and a vulcanizer for the rubber.

8. A fluorescent varnish comprising benzene 5 gals., paravar varnish 5 gals., and anthracene 1 lb.

Signed at Hoboken in the county of Hudson and State of New Jersey, December, A. D. 1924.

LEROY J. BUTTOLPH.